Nov. 20, 1928.

E. POULET 1,692,139

BRAKING MECHANISM FOR FRONT WHEELS ON MOTOR CARS

Filed July 19, 1923  2 Sheets-Sheet 1

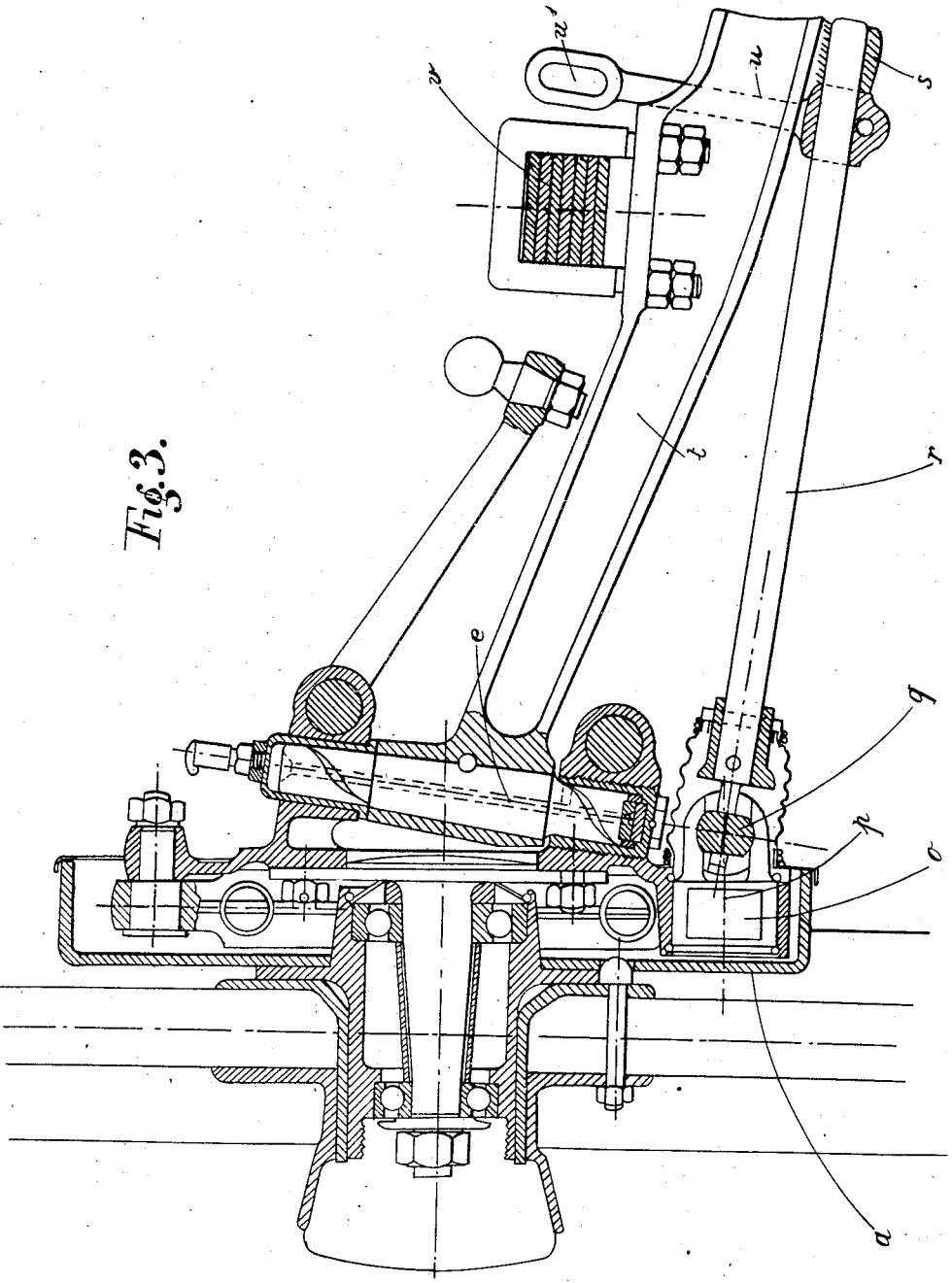

Patented Nov. 20, 1928.

1,692,139

UNITED STATES PATENT OFFICE.

EDOUARD POULET, OF COURBEVOIE, FRANCE.

BRAKING MECHANISM FOR FRONT WHEELS ON MOTOR CARS.

Application filed July 19, 1923. Serial No. 652,645, and in France January 8, 1923.

It is a well known fact that the mounting of the brake on the front wheel of a motor car, having an inclined axle pin, presents great difficulties and great inconveniences owing to the fact that the action exerted upon the said wheels at the steering has the tendency to react upon the mechanism for operating the brake so that the driver is not absolute master of this mechanism. On the other hand the wheel, if the brake is being applied, tends to move in the direction of rotation with the axle and has therefore the tendency to make this axle turn around the points at which it is connected with the frame, said points being situated in the limits of the thickness of the suspension springs. If, as is generally the case, the point of connection of the hand lever with the brake tension rod is distant from the point of rotaton of the wheel axle, this connecting point, which is in this case fixed to the axle, has the tendency to displace itself essentially with regard to the brake tension rod, this rod being fastened to the frame. The resistance opposed by this rod is therefore translated by the action exerted upon the hand lever which alters without the driver's knowledge the conditions under which the brake works.

This invention has for its object to avoid all these inconveniences so that the inclined position given to the wheels with a view to steering and the effects of the braking do not influence at all the brake elements, and with this object in view such arrangements are provided that in any position of the wheel, first the axis of the cam of the brake is perpendicular to the brake cheek, secondly the operating shaft of the brake is perpendicular to the axis of the pivot, thirdly the point at which the driving lever acts is situated within the limits of the thickness of the suspension spring in order to avoid at the application of the brake the displacements of this point with regard to the brake tension rod depending on the frame.

At the moment when the brake is applied the axle will have the tendency to rotate with the wheels. This rotation of the axle takes place around an imaginary horizontal axis close to the resistance points of this rotating movement. These resistance points are the central parts of the springs, as the forces coming from the wheels pass through the central parts of the springs before they act upon the frame through the intermediary of the entire spring. If therefore the connecting lugs of the driving levers are situated within the limits of the thickness of the suspension springs the circumferential movement of these lugs around the imaginary general axis of rotation will be practically suppressed. Owing to this suppression of the movement of the lug of the driving lever during the braking this lug is rendered independent of the possible movements of the axle this being the principal condition for obtaining a braking dependent exclusively on the will of the driver.

This combination of arrangements, which altogether form the invention, may be realized by two forms of execution which will be hereinafter described with reference to the accompanying drawings, wherein:—

Fig. 3 is a cross section showing the second form of construction of a brake.

Figure 1:
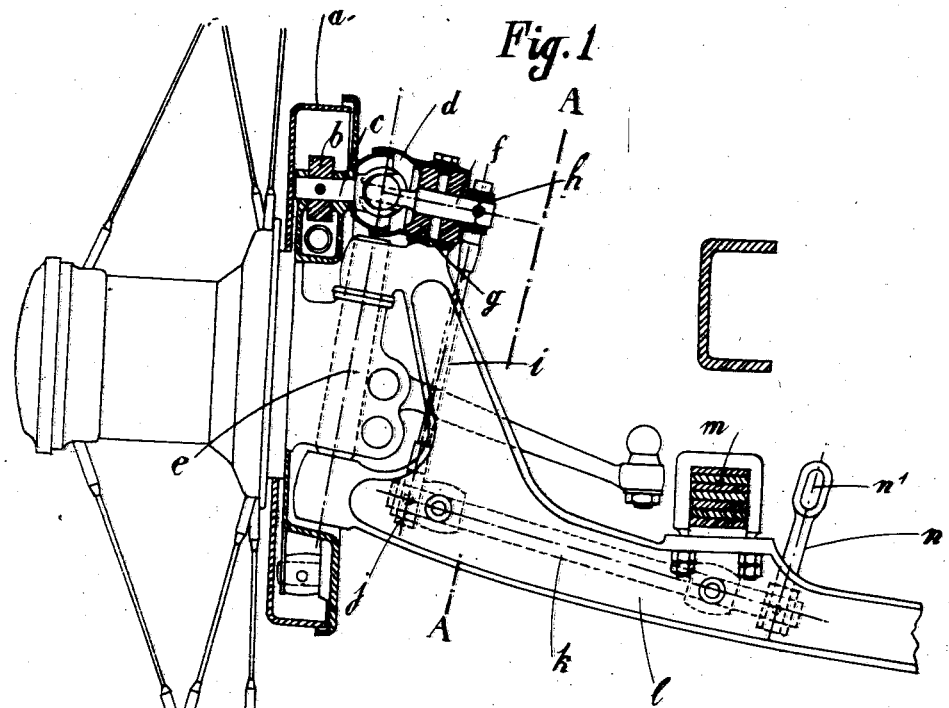
Fig. 1 is a cross section showing the general arrangement of the brake according to the preferred form of construction.
Figure 2:
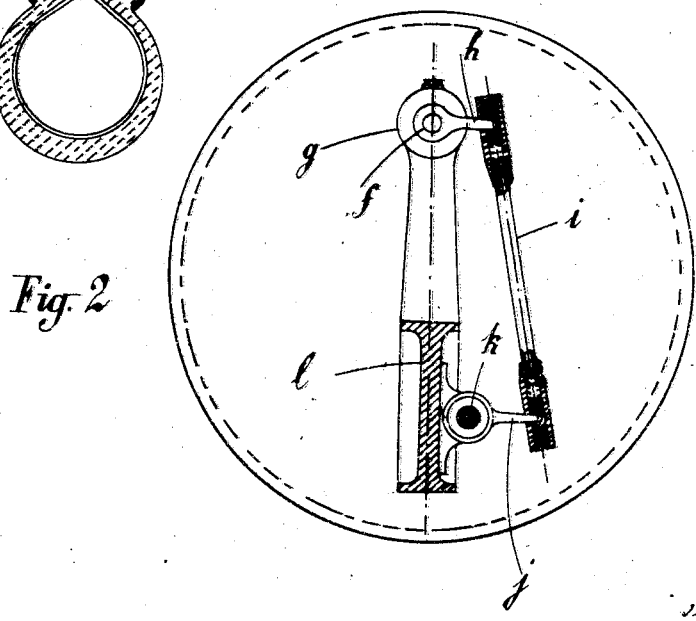
Fig. 2 is a section on line A—A of Fig. 1 taken perpendicularly to the plan of this figure.

With reference to Figs. 1 and 2 $a$ is the brake band and $b$ the cam designed to spread out the brake shoes. According to the preferred form of construction shown in these Figures 1 and 2 the cam $b$ is arranged at the upper part of the brake band. According to the invention the cam shaft $c$ of said cam stands perpendicular to the general plane of the brake band and this shaft is operated through the intermediary of the ball joint $d$ situated in the upper extension of the inclined pivot axis of the wheel from which the shaft $f$ stands perpendicular to the said pivot axis. This shaft $f$ is mounted in the support $g$ fixed to the wheel axle so that the angle of 90° which is formed between the knuckle pin $e$ and shaft $f$ is constant and this shaft carries further the lever $h$ which, by means of a connecting rod $i$ with ball joint is connected with the lever $j$ mounted upon the shaft $k$ carried by the wheel axle $l$ and extending along the same quite close to the suspension spring $m$. The pull lever $n$ is mounted on said shaft $k$ at this point and the lug $n'$ of said lever, to which the brake tension rod is attached, is mounted within the limits of the thickness of the spring, or otherwise expressed, in the imaginary axis of rotation of the wheel axle when at the braking it is drawn along by the wheel.

In the second form of construction (Fig. 3)

the cam o is arranged in the lower part of the brake band a. Its axis p is perpendicular to said brake band and it is connected through the intermediary of the ball shaft q mounted on the lower extension of the axis e around which the wheel pivots, with the rock shaft r of the brake. This rock shaft stands perpendicular to the knuckle pin e and it is supported at its end opposite the cam by a bracket s fixed to the wheel axle t so that the angle of 90° which is formed between the knuckle pin e and rock shaft r be constant. In contact with said bracket s the pull lever u is mounted on said shaft r, said pull lever extending upward so that its connecting lug u' for the tension rod of the brake is situated within the limits of the thickness of the suspension spring v.

These two forms of construction fulfill the three conditions essential for the complete independency of the brake so that the steering manipulations and the effects from braking do not have any influence on the elements of the brake.

I claim:—

A device for operating brakes on the front wheel of motor-cars, comprising in combination a shaft perpendicular to the pivot of the wheel, a support rigid with the wheel-axle and carrying one of the ends of said shaft, a lever keyed on said shaft and having an eye situated at the height of the suspension-spring of the axle, a braking cam, the axis of which is perpendicular to the plane of the brake band, a ball-joint arranged in the extension of the pivot-axle and interposed between said brake-cam and said driving shaft, and means for connecting said ball-joint on the one hand to said driving shaft and on the other hand to said brake-cam.

In testimony whereof I affix my signature.

EDOUARD POULET.